UNITED STATES PATENT OFFICE.

HUGO GELDERMANN, OF GROSS-LICHTERFELDE-OST, NEAR BERLIN, GERMANY, ASSIGNOR TO ACTIEN GESELLSCHAFT FÜR ANILIN FABRIKATION, OF BERLIN, GERMANY.

YELLOW TETRAZO DYE AND PROCESS OF MAKING SAME.

No. 880,293.    Specification of Letters Patent.    Patented Feb. 25, 1908.

Application filed November 6, 1907. Serial No. 400,987.

*To all whom it may concern:*

Be it known that I, HUGO GELDERMANN, a citizen of the German Empire, residing at Gross-Lichterfelde-Ost, near Berlin, Germany, and whose post-office address is Gross-Lichterfelde-Ost, near Berlin, Grabenstrasse 12, have invented certain new and useful Improvements in New Yellow Tetrazo Dyestuffs and Processes of Making Same, of which the following is a specification.

My present invention relates to the manufacture of tetrazo-dyestuffs by tetrazotizing thioanilin disulfonic acid, which acid is described in the *Berichte der Deutschen Chemischen Gesellschaft*, Vol. XXXIX, page 611, combining the tetrazo-compound thus obtained with two molecular proportions of a phenol or a homologue thereof and alkylizing the OH-groups of the tetrazo-dyestuff thus obtained. The coloring matters thus produced dye wool without a mordant from an acid bath clear yellow tints which are fast to milling, and more especially do not bleed into the white cotton when mixed cotton and wool goods are dyed and subsequently subjected to milling.

In order to illustrate my invention I give the following examples, the parts being by weight:

(1). 42 parts of the sodium salt of thioanilin disulfonic acid are diazotized in the usual manner in an aqueous solution by means of 120 parts of hydrochloric acid of 12° Baumé specific gravity, and 14 parts of sodium nitrite. The solution of the tretrazo-compound thus obtained is allowed to run into an aqueous solution of 20 parts of phenol in 25 parts of soda-lye of 40° Baumé specific gravity, and 44 parts of calcined sodium carbonate. The combination being finished, hydrochloric acid is added to the solution until the latter is of nearly neutral reaction; on adding a suitable proportion of common salt the dyestuff is precipitated and the mass is afterwards filtered.

In order to introduce alkyl-groups into the hydroxyl-groups of the dyestuff thus obtained it is not necessary to dry the paste of the product as above produced; one may for instance proceed as follows: The paste of the dyestuff as obtained above is dissolved in 300 parts of alcohol and to this solution are added 24 parts of soda-lye of 40° Baumé specific gravity and 26 parts of ethyl bromid $C_2H_5.Br$. This mixture is then heated in a closed vessel at 60 to 70° C. for about 12 hours. The reaction thus being finished, the alcohol is distilled off and the residue dissolved in water which solution if necessary is brought to neutral reaction. By then adding common salt the product of the reaction is precipitated and is isolated by filtering and drying.

The dyestuff thus obtained dyes wool from an acetic acid bath without a mordant clear and intense yellow tints which are fast to milling and more especially do not bleed into the white cotton which underlies the milling process together with the colored wool.

The new coloring matter possesses in the shape of the sodium salt, as above obtained, the formula:

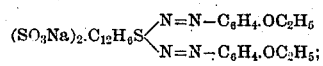

this sodium salt when pulverized forms a reddish yellow powder which easily dissolves in hot water, but rather difficultly in cold water to a yellow solution. This aqueous solution on the addition of some concentrated soda-lye separates yellow flakes and on the addition of some concentrated hydrochloric acid shows a dull brown precipitate, whereas by adding some concentrated liquor ammoniæ the solution is scarcely changed, the color becoming a little lighter. In alcohol the dyestuff dissolves to a yellow solution and in concentrated sulfuric acid to a blue-red solution, which solution on adding some ice separates a dull brown precipitate.

(2). From 42 parts of thioanilin disodium disulfonate and 20 parts of phenol the corresponding tetrazo-dyestuff is produced as indicated in Example 1. And the dyestuff precipitated and pressed to a suitable paste. The wet press-cake is then mixed with 320 parts of alcohol and 24 parts of soda-lye of 40° Baumé specific gravity. The phenolate being formed, an excess of methyl-iodid ($CH_3.I$), for instance 34 parts of it is added to the mass which is then heated in a closed vessel to about 60° C. during 6 hours. The alcohol having been removed by distillation, the residue is dissolved in water, the solution filtered if necessary, and the product of the reaction precipitated from the solution by the addition of common salt, whereupon the product is isolated by filtering, pressing and drying.

The product thus obtained dyes wool from an acid bath (acetic acid) clear and deep yellow shades which are fast to milling and do not bleed into the white cotton.

It is obvious to those skilled in the art that I do not limit my invention to the foregoing examples or to the details given therein.

For the phenol used in the foregoing examples a homologue thereof, such as for instance ortho- or meta-cresol may be substituted. Thus by using thioanilin disulfonic acid and ortho-cresol and introducing the ethyl-group into the two hydroxyl-groups a dyestuff is obtained which dyes wool from acid bath (acetic acid) without a mordant clear and deep yellow tints which are also fast to milling.

If instead of ortho-cresol meta-cresol is employed and the corresponding tetrazo-dyestuff is ethylized a dye-stuff is produced which dyes wool from an acid bath deep yellow shades which are a little more reddish than those obtained with the corresponding dye stuff from ortho-cresol. I also state that the introduction of the alkyl groups into the OH-groups of the tetrazo-dyestuffs may obviously be effected by any other suitable method than that given in my foregoing example.

Having now described my invention and the manner in which the same may be performed what I claim is,—

1. The hereinbefore-described new yellow tetrazo-dyestuffs which may be obtained by tetrazotizing thioanilin disulfonic acid, combining the tetrazo-compound thus obtained with two molecular proportions of a phenol and alkylizing the OH-groups of the tetrazo-dyestuff thus obtained, which new dyestuffs dye wool without a mordant from an acid bath, and more especially from an acetic acid bath, clear and intense yellow tints, which are fast to milling and more especially do not bleed into the white cotton when mixed cotton and wool goods are dyed and subsequently subjected to milling, and which coloring matters when pulverized form in the shape of the sodium salt yellow powders which dissolve in water and in alcohol to a yellow solution and in concentrated sulfuric acid to a blue-red to red solution.

2. The hereinbefore-described new yellow tetrazo-dyestuff having in the shape of the sodium salt the formula:

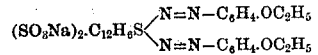

which dyestuff may be obtained by tetrazotizing thioanilin disulfonic acid, combining the tetrazo-compound thus obtained with two molecular proportions of phenol and ethylizing the OH-groups of the tetrazo-dyestuff thus obtained by means of ethyl-bromid and soda-lye, which new dyestuff dyes wool without a mordant from an acid bath, and more especially from an acetic acid bath clear and intense yellow tints which are fast to milling and more especially do not bleed into the white cotton when mixed cotton and wool goods are dyed and subsequently subjected to milling, and which coloring matter in the shape of the sodium salt when pulverized forms a reddish yellow powder which easily dissolves in hot water, but rather difficultly in cold water to a yellow solution, which aqueous solution on the addition of some concentrated soda-lye separates yellow flakes and on the addition of some concentrated hydrochloric acid shows a dull brown precipitate, whereas this aqueous solution by adding some concentrated liquor ammoniæ is scarcely changed, the liquor becoming a little lighter, and which new dyestuff dissolves in alcohol to a yellow solution and in concentrated sulfuric acid to a blue red solution, which solution on adding some ice separates a dull brown precipitate.

In testimony whereof I have hereunto set my hand in presence of two subscribing witnesses.

HUGO GELDERMANN.

Witnesses:
 HENRY HASPER,
 WOLDEMAR HAUPT.